United States Patent
Bisht et al.

(10) Patent No.: US 11,095,497 B2
(45) Date of Patent: Aug. 17, 2021

(54) EFFICIENT TROUBLESHOOTING IN SDN NETWORK

(71) Applicant: Telefonaktiebolaget LM Ericsson (publ), Stockholm (SE)

(72) Inventors: Ashutosh Bisht, Bangalore (IN); Nishant Saurabh, Bangalore (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 22 days.

(21) Appl. No.: 16/330,751

(22) PCT Filed: Sep. 12, 2016

(86) PCT No.: PCT/IB2016/055425
§ 371 (c)(1),
(2) Date: Mar. 5, 2019

(87) PCT Pub. No.: WO2018/046988
PCT Pub. Date: Mar. 15, 2018

(65) Prior Publication Data
US 2019/0229977 A1    Jul. 25, 2019

(51) Int. Cl.
*H04L 12/24* (2006.01)
*H04L 12/26* (2006.01)
(Continued)

(52) U.S. Cl.
CPC ...... *H04L 41/0645* (2013.01); *H04L 41/0803* (2013.01); *H04L 43/062* (2013.01);
(Continued)

(58) Field of Classification Search
None
See application file for complete search history.

(56) References Cited

U.S. PATENT DOCUMENTS 8,561,025 B1   10/2013  Bisht et al.
2013/0176888 A1*  7/2013  Kubota .................. H04L 49/35
                                                                       370/252
(Continued)

FOREIGN PATENT DOCUMENTS

WO    2018/203108 A1    11/2018

OTHER PUBLICATIONS

Zhi, et al., "MED: The Monitor-Emulator-Debugger for Software-Defined Networks", IEEE INFOCOM 2016—The 35th Annual IEEE International Conference on Computer Communications, IEEE, Apr. 10, 2016, 10 pages.
(Continued)

*Primary Examiner* — Peter Chen
*Assistant Examiner* — Jeff Banthrongsack
(74) *Attorney, Agent, or Firm* — Sage Patent Group

(57) ABSTRACT

A method is implemented by a switch in a Software Defined Networking (SDN) network to trace packets belonging to a flow. The method includes setting a value in a first field and a second field associated with the packet to indicate that tracing is enabled for the packet, where the second field is a field that is not used for packet matching, determining, at a second flow table, whether tracing is enabled for the packet based on the value in the first field, transmitting a trace message for the packet to a trace collector in response to a determination that tracing is enabled for the packet, setting a value in the first field to indicate that tracing is disabled for the packet, resubmitting the packet to the second flow table, and copying the value in the second field to the first field before directing the packet to another flow table.

24 Claims, 9 Drawing Sheets

(51) Int. Cl.
H04L 12/721 (2013.01)
H04L 12/933 (2013.01)
H04L 12/725 (2013.01)
H04L 12/715 (2013.01)
H04L 12/851 (2013.01)

(52) U.S. Cl.
CPC ............ *H04L 43/12* (2013.01); *H04L 45/306* (2013.01); *H04L 45/38* (2013.01); *H04L 45/64* (2013.01); *H04L 47/2483* (2013.01); *H04L 49/1546* (2013.01)

(56) References Cited

U.S. PATENT DOCUMENTS

| | | |
|---|---|---|
| 2015/0281036 A1 | 10/2015 | Sun et al. |
| 2016/0112328 A1 | 4/2016 | Anand et al. |
| 2016/0142301 A1* | 5/2016 | Anand .................... H04L 45/54 370/389 |

OTHER PUBLICATIONS

Handigol, et al., "Where is the Debugger for my Software Defined Network?," ACM, HotSDN'12, Aug. 13, 2012, Helsinki, Finland, 6 pages.

* cited by examiner

Transmit a first set of instructions to the switch that instruct the switch to, for each packet belonging to the flow that arrives at a first flow table of a packet processing pipeline, set the value in the first field associated with that packet and the value in the second field associated with that packet to indicate that tracing is enabled for that packet, where the second field associated with that packet is a field that is not used for packet matching (610)

Transmit a second set of instructions to the switch that instruct the switch to, for each packet that arrives at a second flow table of the packet processing pipeline for which the value in the first field associated with that packet indicates that tracing is enabled for that packet, transmit a trace message for that packet to a trace collector, set the value in the first field associated with that packet to indicate that tracing is disabled for that packet, and resubmit that packet to the second flow table (620)

Transmit a third set of instructions to the switch that instruct the switch to, for each packet matching a flow entry in the second flow table, copy the value in the second field associated with that packet to the first field associated with that packet (630)

Fig. 6

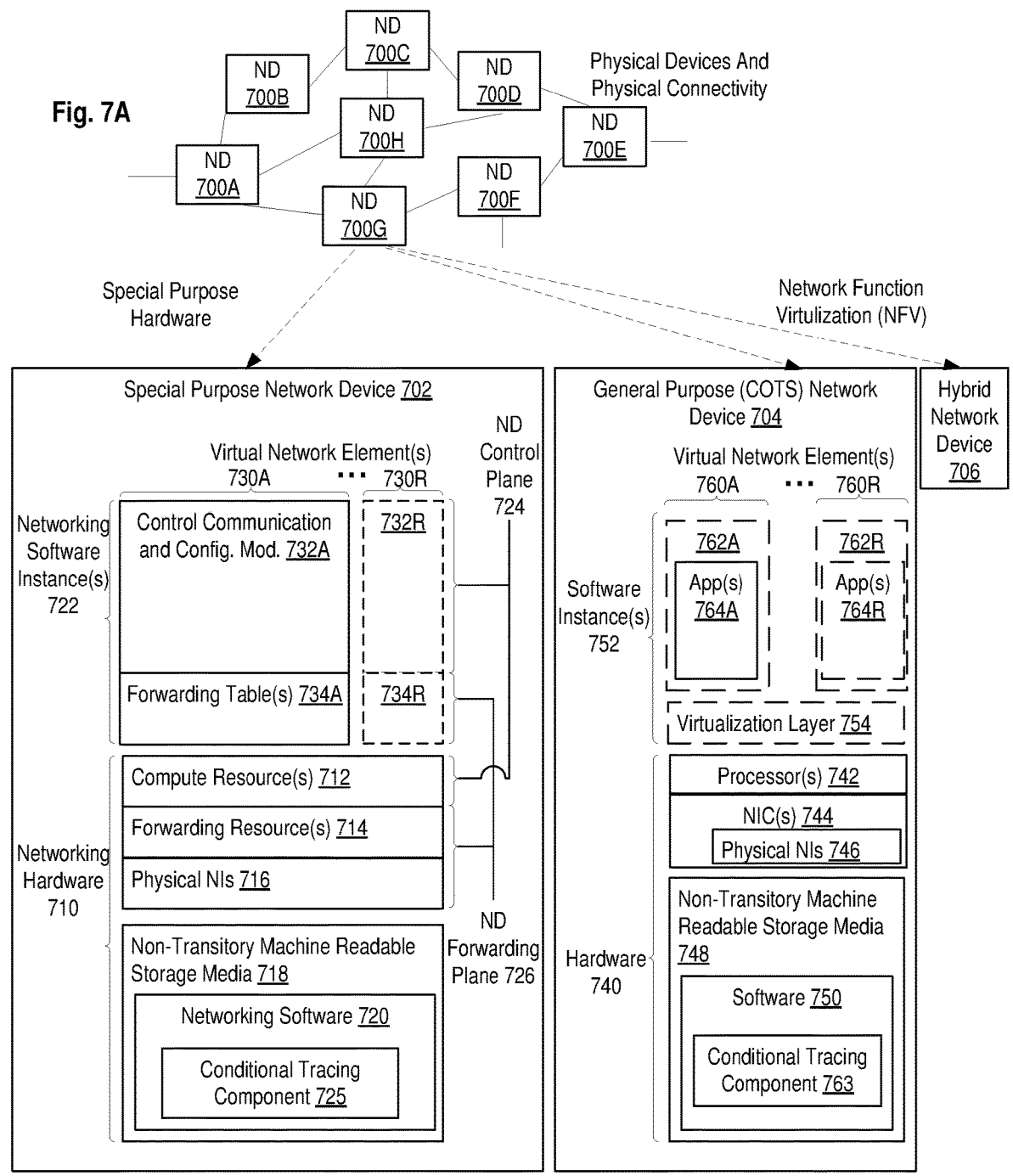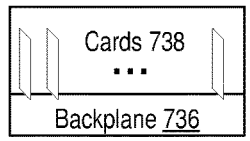

EFFICIENT TROUBLESHOOTING IN SDN NETWORK

CROSS-REFERENCE TO RELATED APPLICATIONS

This application is a national stage of International Application No. PCT/IB2016/055425, filed Sep. 12, 2016, which is hereby incorporated by reference.

TECHNICAL FIELD

Embodiments of the invention relate to the field of Software Defined Networking (SDN), and more specifically, to conditionally tracing packets in an SDN network.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

An SDN network typically includes multiple switches interconnected with each other and one or more controllers that control the forwarding behavior of the switches. A controller can control the programming of flow tables in the switches to implement any forwarding protocol.

An OpenFlow switch includes a packet processing pipeline that includes one or more flow tables. Each flow table includes one or more flow entries, where each flow entry includes a packet matching criteria and a set of instructions. When an incoming packet matches the packet matching criteria of a flow entry, the corresponding set of instructions of that flow entry are executed. The set of instructions may instruct the switch to perform various operations on the packet including, but not limited to, forwarding the packet to a given port, modifying certain bits in the packet header, encapsulating the packet, and dropping the packet.

In OpenFlow, packet processing starts at the first flow table of the packet processing pipeline, and may continue to additional flow tables of the packet processing pipeline. When processed by a flow table, the packet is matched against the flow entries of the flow table to find a matching flow entry. If a matching flow entry is found, the set of instructions included in that flow entry is executed. The set of instructions may include an instruction to direct the packet to another flow table.

The packet processing pipeline of an OpenFlow switch can become extremely complex. For example, a controller can program the switch with many different flow tables and the flow entries within those flow tables can include instructions that direct packets to other flow tables. With such a complex processing pipeline, when a packet does not traverse its intended packet processing path, it can become extremely difficult to troubleshoot.

SUMMARY

A method is implemented by a switch in a Software Defined Networking (SDN) network to trace packets belonging to a flow in the SDN network, where the switch includes a packet processing pipeline that includes a plurality of flow tables. The method includes receiving a packet belonging to the flow, setting a value in a first field associated with the packet and a value in a second field associated with the packet to indicate that tracing is enabled for the packet in response to a determination at a first flow table of the packet processing pipeline that the packet is to be traced, where the second field associated with the packet is a field that is not used for packet matching, determining, at a second flow table of the packet processing pipeline, whether tracing is enabled for the packet based on the value in the first field associated with the packet, transmitting a trace message for the packet to a trace collector in response to a determination at the second flow table that tracing is enabled for the packet, setting a value in the first field associated with the packet to indicate that tracing is disabled for the packet, resubmitting the packet to the second flow table, and copying, at the second flow table, the value in the second field associated with the packet to the first field associated with the packet before directing the packet to another flow table of the packet processing pipeline.

A method is implemented by a controller in a Software Defined Networking (SDN) network to cause a switch in the SDN network to trace packets belonging to a flow, where the controller is communicatively coupled to the switch, and where the switch includes a packet processing pipeline that includes a plurality of flow tables. The method includes transmitting a first set of instructions to the switch that instruct the switch to, for each packet belonging to the flow that arrives at a first flow table of the packet processing pipeline, set a value in a first field associated with that packet and a value in a second field associated with that packet to indicate that tracing is enabled for that packet, wherein the second field associated with that packet is a field that is not used for packet matching.

A network device configured to function as a switch in a Software Defined Networking (SDN) network to trace packets belonging to a flow in the SDN network, where the switch includes a packet processing pipeline that includes a plurality of flow tables. The network device includes a set of one or more processors and a non-transitory machine-readable storage medium having stored therein a conditional tracing component. The conditional tracing component, when executed by the set of one or more processors, causes the network device to receive a packet belonging to the flow, set a value in a first field associated with the packet and a value in a second field associated with the packet to indicate that tracing is enabled for the packet in response to a determination at a first flow table of the packet processing pipeline that the packet is to be traced, wherein the second field associated with the packet is a field that is not used for packet matching, determine, at a second flow table of the packet processing pipeline, whether tracing is enabled for the packet based on the value in the first field associated with the packet, transmit a trace message for the packet to a trace collector in response to a determination at the second flow table that tracing is enabled for the packet, set a value in the first field associated with the packet to indicate that tracing is disabled for the packet, resubmit the packet to the second flow table, and copy, at the second flow table, the value in the second field associated with the packet to the first field associated with the packet before directing the packet to another flow table of the packet processing pipeline.

A network device configured to function as a controller in a Software Defined Networking (SDN) network to cause a switch in the SDN network to trace packets belonging to a flow, where the controller is communicatively coupled to the switch, and where the switch includes a packet processing pipeline that includes a plurality of flow tables. The network device includes a set of one or more processors and a non-transitory machine-readable storage medium having stored therein a conditional tracing component. The conditional tracing component, when executed by the set of one or more processors, causes the network device to transmit a first set of instructions to the switch that instruct the switch to, for each packet belonging to the flow that arrives at a first flow table of the packet processing pipeline, set a value in a first field associated with that packet and a value in a second field associated with that packet to indicate that tracing is enabled for that packet, wherein the second field associated with that packet is a field that is not used for packet matching.

A non-transitory machine-readable medium has computer code stored therein, which when executed by a set of one or more processors of a network device functioning as a switch in a Software Defined Networking (SDN) network, causes the network device to perform operations for tracing packets belonging to a flow in the SDN network, where the switch includes a packet processing pipeline that includes a plurality of flow tables. The operations include receiving a packet belonging to the flow, setting a value in a first field associated with the packet and a value in a second field associated with the packet to indicate that tracing is enabled for the packet in response to a determination at a first flow table of the packet processing pipeline that the packet is to be traced, where the second field associated with the packet is a field that is not used for packet matching, determining, at a second flow table of the packet processing pipeline, whether tracing is enabled for the packet based on the value in the first field associated with the packet, transmitting a trace message for the packet to a trace collector in response to a determination at the second flow table that tracing is enabled for the packet, setting a value in the first field associated with the packet to indicate that tracing is disabled for the packet, resubmitting the packet to the second flow table, and copying, at the second flow table, the value in the second field associated with the packet to the first field associated with the packet before directing the packet to another flow table of the packet processing pipeline.

A non-transitory machine-readable medium has computer code stored therein, which when executed by a set of one or more processors of a network device functioning as a controller in a Software Defined Networking (SDN) network, causes the network device to perform operations for causing a switch in the SDN network to trace packets belonging to a flow, where the controller is communicatively coupled to the switch, and where the switch includes a packet processing pipeline that includes a plurality of flow tables. The operations include transmitting a first set of instructions to the switch that instruct the switch to, for each packet belonging to the flow that arrives at a first flow table of the packet processing pipeline, set a value in a first field associated with that packet and a value in a second field associated with that packet to indicate that tracing is enabled for that packet, wherein the second field associated with that packet is a field that is not used for packet matching.

BRIEF DESCRIPTION OF THE DRAWINGS

The invention may best be understood by referring to the following description and accompanying drawings that are used to illustrate embodiments of the invention. In the drawings:

FIG. 6 is a flow diagram of a process for causing a switch to conditionally trace packets in an SDN network, according to some embodiments.

FIG. 7A illustrates connectivity between network devices (NDs) within an exemplary network, as well as three exemplary implementations of the NDs, according to some embodiments.

FIG. 7B illustrates an exemplary way to implement a special-purpose network device, according to some embodiments.

DETAILED DESCRIPTION

Figure 1:
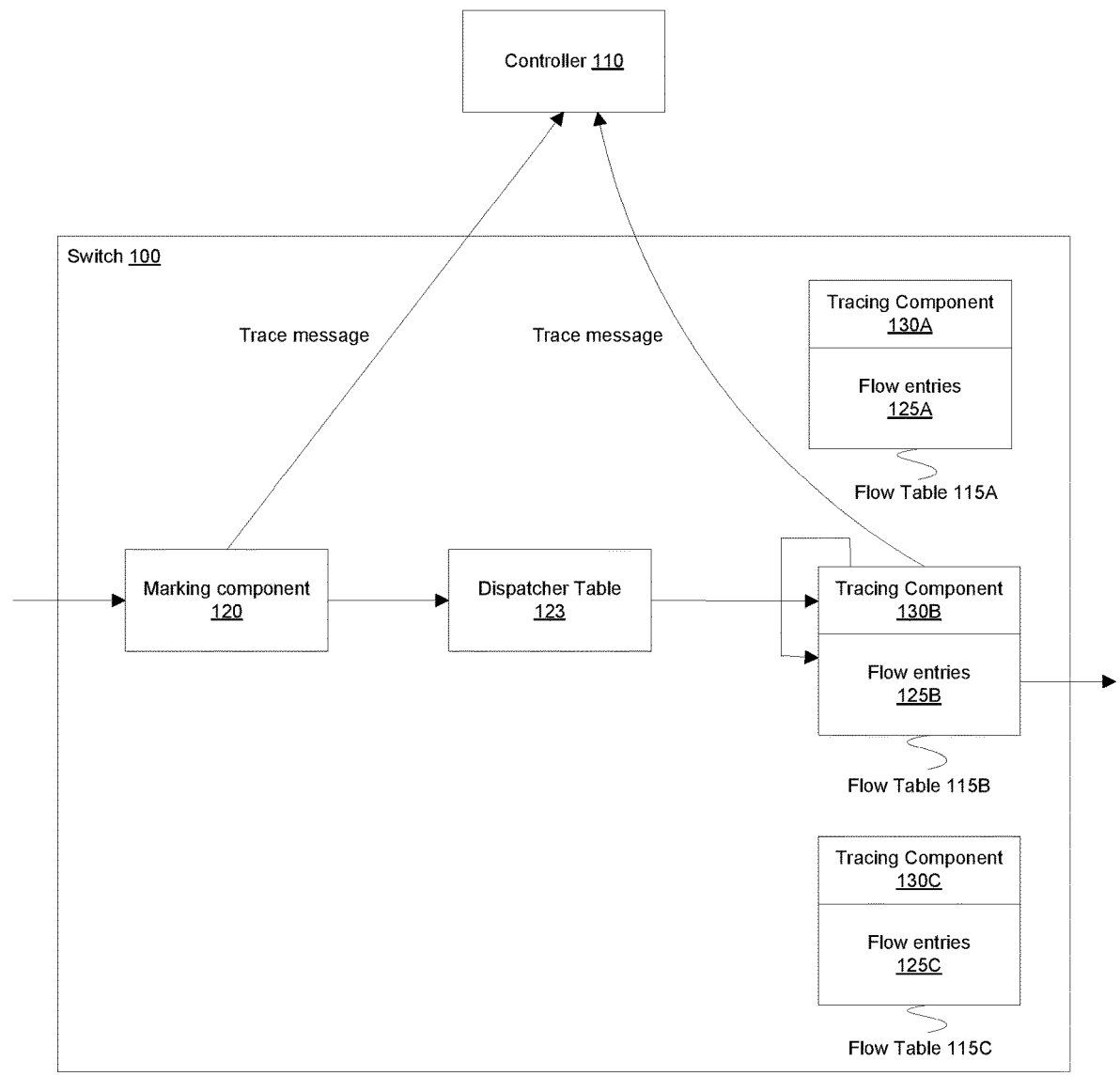
FIG. 1 is a block diagram of a network in which conditional packet tracing can be implemented, according to some embodiments.

The following description describes methods and apparatus for conditionally tracing packets in a Software Defined Networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Packet processing pipelines in SDN switches are becoming increasingly complex. As a result, when packets do not traverse their intended packet processing path, it can become extremely difficult to troubleshoot. One existing technique for troubleshooting packet processing in an SDN network sends a small "postcard" every time a packet visits a switch. A postcard is a truncated copy of the packet's header, augmented with an indication of the matching flow entry, an indication of the switch, and an indication of the output port. A collector module collects such postcards and is able to trace the packet based on an analysis of the collected postcards.

A drawback of this technique is that the switch executes a modified version of the control flow than what the controller had originally programmed. With this technique, a proxy module intercepts flow modification messages transmitted by the controller (to the switch) and dynamically modifies the flow modification messages so that they instruct the switch to output postcards to a collector module. Modifying flow entries in this way without controller involvement may cause various operational issues. For example, during troubleshooting, flow entries in the switch may be out-of-sync with the flow entries installed by the controller.

Another drawback of this technique is that it requires additional processing and bandwidth, even when troubleshooting is not needed. With this technique, postcards are generated for every packet at every switch. This consumes additional processing resources at switches and also consumes additional bandwidth (e.g., on the path between the switch and the collector module). It is estimated that transmitting postcards with this technique results in sustained traffic increase of thirty percent.

Embodiments described herein overcome the disadvantages of existing techniques by allowing for conditional tracing of a packet. With conditional packet tracing, tracing can be configured such that only the packets of interest are traced (e.g., packets belonging to a particular flow). Embodiments described herein achieve this by providing a tracing infrastructure within a switch. The tracing infrastructure in a switch includes a marking component and one or more tracing components. The marking component marks packets of interest to indicate that tracing is enabled for those packets. More specifically, the marking component sets a value in a first field associated with a packet and a second field associated with the packet to indicate that tracing is enabled for the packet, where the second field is a field that is not used for packet matching. One or more of the flow tables in the switch may include a tracing component. Whenever a packet arrives at a flow table with a tracing component, the tracing component determines whether tracing is enabled for the packet based on the value in the first field associated with the packet. If the tracing component determines that tracing is enabled for the packet (based on the value in the first field), then the tracing component transmits a trace message for the packet to a trace collector. The tracing component then sets the value in the first field associated with the packet to indicate that tracing is disabled for the packet and resubmits the packet to the flow table. This way, the packet is matched against the normal (non-tracing) flow entries in the flow table (e.g., the same flow entries that the packet would have been matched against if tracing was disabled). In one embodiment, flow entries in the flow table may include instructions that instruct the switch to copy the value in the second field associated with the packet to the first field associated with the packet before directing the packet to another flow table of the packet processing pipeline. This allows the packet to be traced at the next flow table. Embodiments are further described herein with reference to the accompanying figures.

FIG. 1 is a block diagram of a network in which conditional packet tracing can be implemented, according to some embodiments. The network is a Software Defined Networking (SDN) network that includes a controller 110 and a switch 100. For sake of illustration, the network is shown as including a single controller 110 and a single switch 100. However, it should be understood that the network can include more than one controller 110 and more than one switch 100. As shown in the diagram, the switch 100 includes a marking component 120 and flow tables 115A-C. Each flow table 115 includes a tracing component 130 (e.g., tracing components 130A-C) and flow entries 125 (e.g., flow entries 125A-C).

When a packet arrives at the switch 100, the marking component 120 determines whether the packet is a packet of interest (e.g., a packet that is to be traced). If so, the marking component 120 marks the packet to indicate that tracing is enabled for the packet. More specifically, the marking component 120 sets a value in a first field associated with the packet and a value in a second field associated with the packet to indicate that tracing is enabled for the packet, where the second field associated with the packet is a field that is not used for packet matching. As will become apparent from the descriptions provided herein, the value in the first field associated with the packet is a more immediate indicator of whether tracing is enabled for the packet (and the value may change as the packet travels through the packet processing pipeline), while the value in the second field associated with the packet is a more permanent indicator of whether tracing is enabled for the packet (the value typically stays the same as the packet travels through the packet processing pipeline). In an embodiment where the switch 100 is an OpenFlow switch, the first field associated with the packet may be a predetermined bit in a metadata field associated with the packet (e.g., metadata field as defined in OpenFlow) and the second field associated with the packet may be a predetermined bit in a packet register field associated with the packet (e.g., packet register field as defined in OpenFlow version 1.5). In one embodiment, the marking component 120 may set these bits to a value of '1' to indicate that tracing is enabled for the packet (a value of '0' in these bits may indicate that tracing is disabled for the packet). If the marking component 120 determines that the packet is a packet of interest, the marking component 120 may also transmit a trace message for the packet to a trace collector. In this example, the controller 110 functions as the trace collector, and thus this trace message (and other trace messages) is transmitted to the controller 110. However, it should be understood that a different entity than the controller 110 could function as the trace collector. The trace message for the packet may include a portion of the packet's header or other information that can be used to identify the packet. In one embodiment, the trace message for the packet may include a portion of the packet's payload (e.g., first n bytes of the payload) in order to help distinguish trace messages for the packet from trace messages for other packets with the same header information. The trace message for the packet may also include an indication that the trace message was generated as a result of the packet arriving at the marking component 120 or other relevant contextual information (e.g., timestamp). This trace message serves to indicate that the packet arrived at the marking component 120. The marking component 120 then directs the packet to a dispatcher table 123. The dispatcher table 123 may direct the packet to the appropriate flow table 115 for further processing (e.g., based on the contents of the packet header). In this example, the dispatcher table 123 directs the packet to flow table 115B.

When the packet arrives at flow table 115B, the tracing component 130B of flow table 115B determines whether tracing is enabled for the packet based on the value in the first field associated with the packet. For example, in an embodiment where the first field associated with the packet is a predetermined bit in a metadata field associated with the packet, the tracing component 130B may determine that tracing is enabled for the packet if the bit is set to a value of '1' and determine that tracing is disabled for the packet if the bit is set to a value of '0'. If the tracing component 130B determines that tracing is enabled for the packet (based on the value in the first field), then the tracing component 130B transmits a trace message for the packet to a trace collector (e.g., the controller 110 in this example). The trace message for the packet may include a portion of the packet's header or other information that can be used to identify the packet (e.g., first n bytes of payload). The trace message for the packet may also include an indication that the trace message was generated as a result of the packet arriving at flow table 115B or other relevant contextual information (e.g., timestamp). The tracing component 130B then sets the value in the first field associated with the packet to indicate that tracing is disabled for the packet and resubmits the packet to flow table 115B. Since the value in the first field associated with the packet is now set to indicate that tracing is disabled for the packet, the tracing component 130B does not transmit a trace message for the packet to the trace collector. Rather, the packet is matched against the normal (non-tracing) flow entries 125B in flow table 115B (e.g., the same flow entries 125 that the packet would have been matched against if tracing was disabled). In this example, the packet matches a flow entry that causes the packet to exit the switch 100. However, it is also possible that the packet matches a flow entry that causes the packet to be directed to another flow table 115. In one embodiment, one or more of the flow entries 125B in flow table 115B may include instructions that instruct the switch 100 to copy the value in the second field associated with the packet to the first field associated with the packet before directing the packet to another flow table 115 of the packet processing pipeline (i.e., copy contents from second field to first field). This allows the packet to be traced at the next flow table 115. The other tracing components 130 of the other flow tables 115 (e.g., tracing component 130A and 130C) may perform similar operations to those described above with reference to tracing component 130B to trace packets that arrive at their respective flow tables 115, and are not further described herein for sake of brevity and avoiding redundancy.

Figure 2:
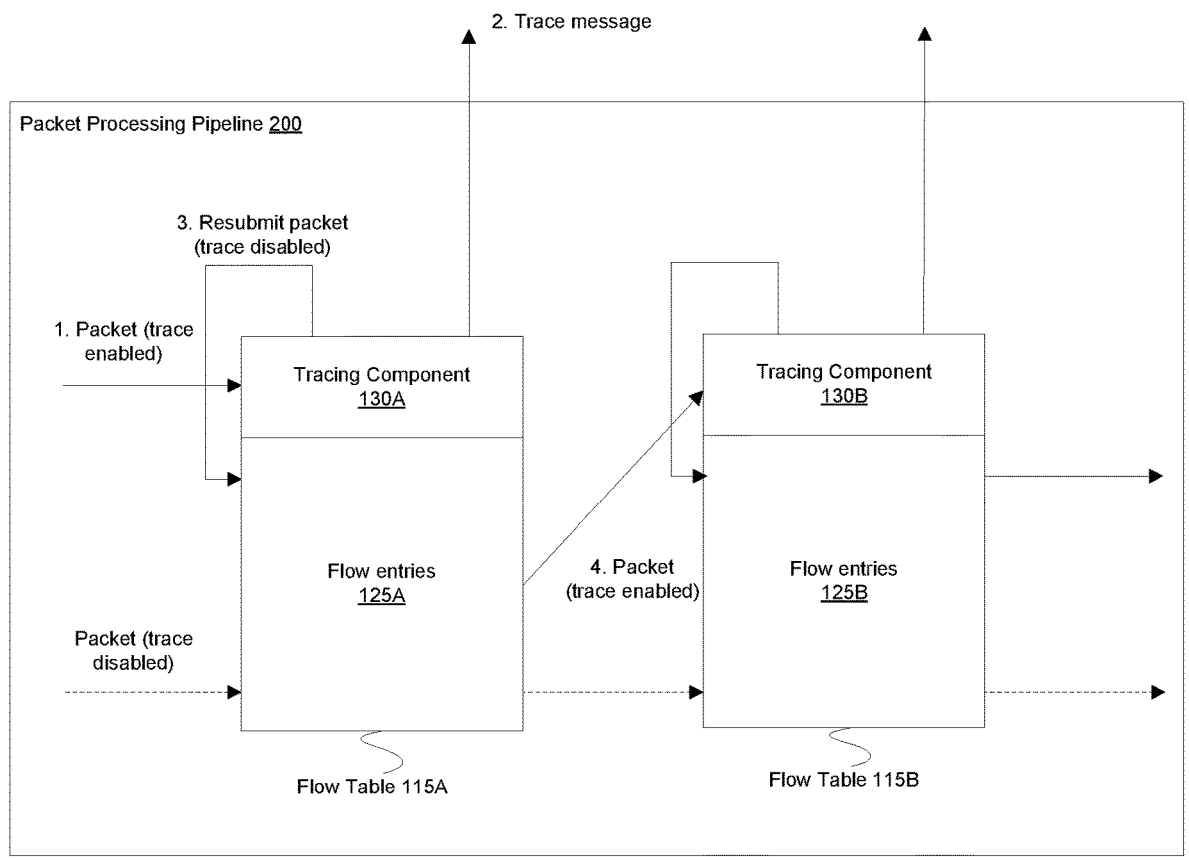
FIG. 2 is a block diagram of a packet processing pipeline within a switch that implements conditional packet tracing, according to some embodiments.

FIG. 2 is a block diagram of a packet processing pipeline within a switch that implements conditional packet tracing, according to some embodiments. As shown in the diagram, the packet processing pipeline 200 includes two flow tables 115. Flow table 115A includes tracing component 130A and flow entries 125A. Flow table 115B includes tracing component 130B and flow entries 125B. For sake of illustration, the packet processing pipeline 200 is shown as including two flow tables 115. However, it should be understood that the packet processing pipeline 200 can include more or less than two flow tables 115. Packet processing operations will now be described with reference to the exemplary packet processing pipeline 200.

At operation 1, a packet for which tracing is enabled arrives at flow table 115A and is initially processed by tracing component 130A. The value in the first field associated with the packet (e.g., a predetermined bit in the metadata field associated with the packet) and the value in the second field associated with the packet (e.g., a predetermined bit in the packet register field associated with the packet) may have been previously set (e.g., by marking component 120 (not shown)) to indicate that tracing is enabled for the packet. For example, the predetermined bit in the metadata field associated with the packet and the predetermined bit in the packet register field associated with the packet may have been previously set to '1' to indicate that tracing is enabled for the packet.

At operation 2, since the value in the first field associated with the packet is set to indicate that tracing is enabled for the packet (e.g., the predetermined bit in the metadata field associated with the packet is set to '1'), the tracing component 130A transmits a trace message for the packet to the trace collector. In one embodiment, the trace collector is a controller 110 that manages the switch 100. In other embodiments, the trace collector may be a different entity.

The tracing component 130A then sets the value in the first field associated with the packet to indicate that tracing is disabled for the packet (e.g., sets the predetermined bit in the metadata field associated with the packet to '0') and at operation 3, resubmits the packet to flow table 115A. When the packet is resubmitted to flow table 115A, the tracing component 130A does not transmit a trace message for the packet to the trace collector since the value in the first field associated with the packet is set to indicate that tracing is disabled for the packet. Rather, the packet is matched against flow entries 125A.

Subsequently, the packet may match a particular flow entry from flow entries 125A. In this example, the packet matches a flow entry that includes instructions that instruct the switch 100 to direct matching packets to flow table 115B of the packet processing pipeline 200. In addition, the flow entry may include instructions that instruct the switch 100 to copy the value in the second field associated with the packet to the first field associated with the packet before directing the packet to flow table 115B. Thus, the switch 100 copies the value in the second field associated with the packet (which was previously set (e.g., by marking component 120 (not shown)) to indicate that tracing is enabled for the packet) to the first field associated with the packet, which results in the first field associated with the packet being set to indicate that tracing is enabled for the packet. At operation 4, the switch 100 then directs the packet to flow table 115B. Since the value in the first field associated with the packet is set to indicate that tracing is enabled for the packet, when the packet arrives at flow table 115B, tracing component 130B transmits a trace message for the packet to the trace collector and may perform similar operations as performed at flow table 115A.

Packet processing for a packet for which tracing is disabled is shown in the diagram in broken lines. A packet for which tracing is disabled is matched against flow entries 125A at flow table 115A and matched against flow entries 125 at flow table 115B (and no trace messages are generated for this packet). The packet is thus, in effect, processed normally as if the tracing infrastructure (e.g., tracing components 130) did not exist.

In one embodiment, the marking component 120 is implemented as a flow table in the packet processing pipeline 200. This flow table 115 may be referred to herein as a marking component flow table. Each flow entry in the marking component flow table may include a packet matching criteria that matches packets belonging to a flow that is to be traced and a corresponding set of instructions that instruct the switch 100 to set the value in the first field associated with a packet matching the packet matching criteria and the value in the second field associated with the packet to indicate that tracing is enabled for the packet. In one embodiment, the flow entry also includes instructions that instruct the switch 100 to transmit a trace message for the packet to a trace collector. In one embodiment, the marking component flow table is the first flow table in the packet processing pipeline 200 of the switch 100 to ensure that packet tracing is performed from the very beginning of the packet processing pipeline 200.

Table I is a table that lists exemplary flow entries that can be included in a marking component flow table.

TABLE I

| Packet Matching Criteria | Instructions |
|---|---|
| Source IP address = 10.1.1.1 | Transmit trace message |
| | Set bit in metadata field to '1' |
| | Set bit in packet register field to '1' |
| Source IP address = 10.2.2.2; | Transmit trace message |
| Destination IP address = 11.1.1.1 | Set bit in metadata field to '1' |
| | Set bit in packet register field to '1' |

The first flow entry matches packets that have a source IP address of 10.1.1.1. According to the instructions of the first flow entry, when a packet matches the first flow entry, a trace message for the packet is transmitted to a trace collector and the predetermined bit in the metadata field associated with the packet and the predetermined bit in the packet register field associated with the packet is set to '1' to indicate that tracing is enabled for the packet. In this example, the predetermined bit in the metadata field associated with the packet corresponds to what is referred to herein as the first field associated with the packet and the predetermined bit in the packet register field corresponds to what is referred to herein as the second field associated with the packet. It should be understood, however, that different bits/fields can be used for indicating whether tracing is enabled for the packet. It should also be understood that the first field and the second field associated with the packet may be a field in the packet itself or other field otherwise associated with the packet (e.g., a field used by the packet processing pipeline 200 to carry information pertaining to the packet). The second flow entry matches packets that have a source IP address of 10.2.2.2 and a destination IP address of 11.1.1.1. According to the instructions of the second flow entry, when a packet matches the second flow entry, a trace message for the packet is transmitted to the trace collector and the predetermined bit in the metadata field associated with the packet and the predetermined bit in the packet register field associated with the packet is set to '1' to indicate that tracing is enabled for the packet. Although Table I shows two flow entries, it should be understood that the marking component flow table can include additional flow entries to enable packet tracing for additional flows.

In one embodiment, each tracing component 130 is implemented as a flow entry in a flow table 115. This flow entry may be referred to herein as a tracing component flow entry of the flow table 115. The tracing component flow entry of a flow table 115 may include a packet matching criteria that matches packets for which the value in the first field associated with the packet indicates that tracing is enabled for the packet and a corresponding set of instructions that instruct the switch 100 to transmit a trace message for a packet that matches the packet matching criteria to a trace collector, set the value in the first field associated with the packet to indicate that tracing is disabled for the packet, and resubmit the packet to the flow table 115. In one embodiment, the tracing component flow entry of the flow table 115 is the highest priority flow entry in the flow table 115 to ensure that packet tracing is performed before matching the packet against normal (non-tracing) flow entries 125.

Table II is a table that lists an exemplary tracing component flow entry of a flow table 115.

TABLE II

| Packet Matching Criteria | Instructions |
| --- | --- |
| Bit in metadata field set to '1' | Transmit trace message<br>Set value of bit in metadata field to '0'<br>Resubmit to current flow table |

The tracing component flow entry matches packets for which the predetermined bit in the metadata field associated with the packet is set to '1' (which indicates that tracing is enabled for the packet). According to the instructions of the tracing component flow entry, when a packet matches the tracing component flow entry, a trace message for the packet is transmitted to a trace collector, the predetermined bit in the metadata field is set to '0' to indicate that tracing is disabled for the packet, and the packet is resubmitted to the current flow table 115. In this example, the predetermined bit in the metadata field associated with the packet corresponds to what is referred to herein as the first field associated with the packet.

In one embodiment, a normal (non-tracing) flow entry in a flow table is modified to include instructions that instruct the switch 100 to copy the value in the second field associated with a packet to the first field associated with the packet before directing the packet to another flow table of the packet processing pipeline 200. This allows the packet to be traced at the next flow table.

Table III is a table listing a flow entry before it is modified and Table IV is a table listing the flow entry after it is modified.

TABLE III

| Packet Matching Criteria | Instructions |
| --- | --- |
| Source IP address = 1.1.1.1 | Action X<br>Action Y |

TABLE IV

| Packet Matching Criteria | Instructions |
| --- | --- |
| Source IP address = 1.1.1.1 | Action X<br>Action Y<br>Copy value of bit in packet register field to bit in metadata field |

The original flow entry (as shown in Table III) matches packets that have a source IP address of 1.1.1.1. According to the instructions of the original flow entry, when a packet matches the flow entry, action X and action Y (which could be any type of action) are executed. The modified flow entry (as shown in Table IV) is similar to the original flow entry shown in Table III except that it includes an additional instruction to copy the value of the predetermined bit in the packet register field associated with the packet to the predetermined bit in the metadata field associated with the packet. In this example, the predetermined bit in the metadata field associated with the packet corresponds to what is referred to herein as the first field associated with the packet and the predetermined bit in the packet register field corresponds to what is referred to herein as the second field associated with the packet.

Figure 3:
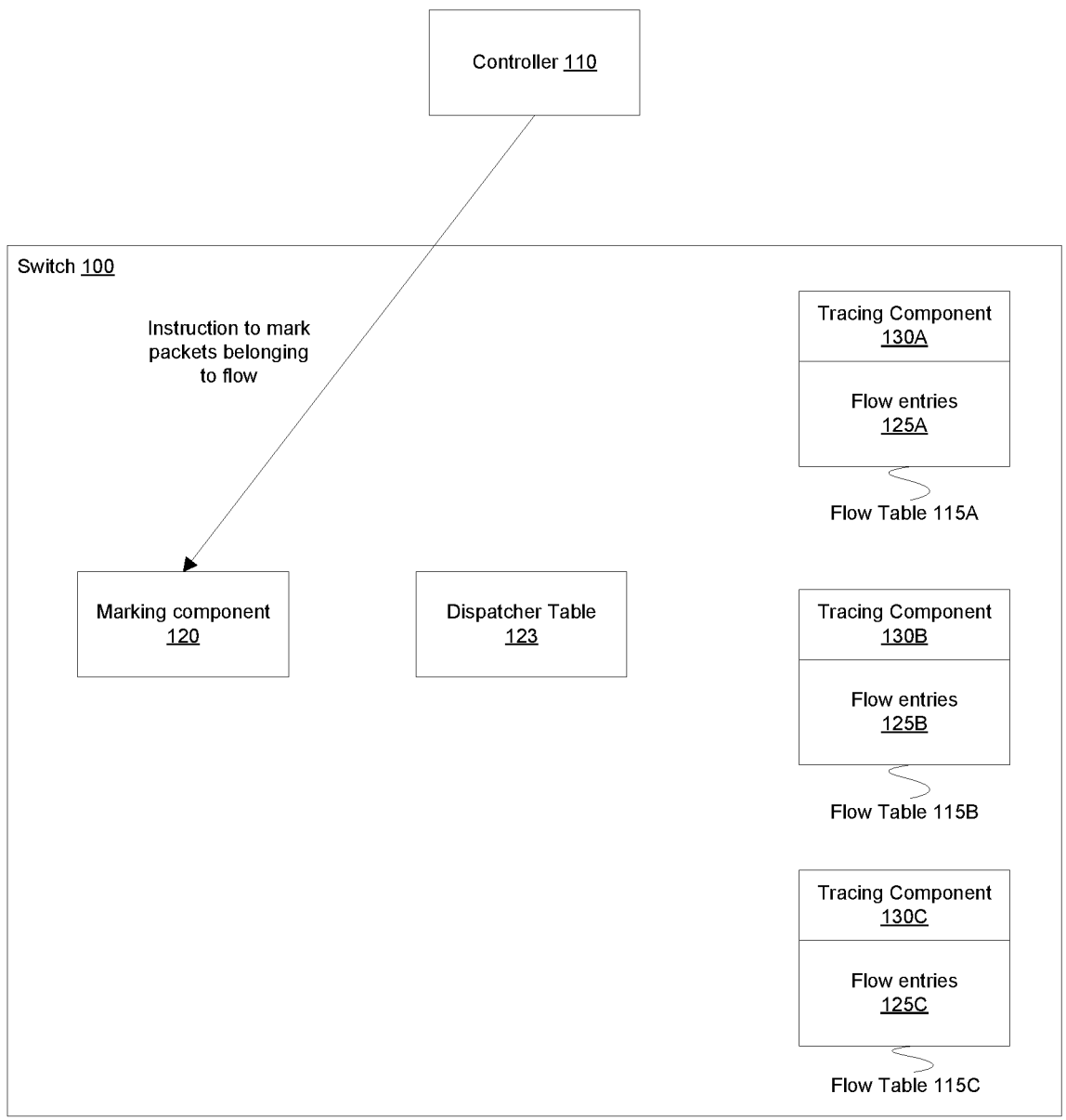
FIG. 3 is a block diagram illustrating a controller enabling packet tracing for packets belonging to a flow within a packet tracing infrastructure, according to some embodiments.

FIG. 3 is a block diagram illustrating a controller enabling packet tracing for packets belonging to a flow within a packet tracing infrastructure, according to some embodiments. The packet tracing infrastructure in switch 100 includes marking component 120 and one or more tracing components 130. Each of the one or more tracing components 130 is attached to or otherwise associated with a flow table 115. In one embodiment, a controller 110 can setup the packet tracing infrastructure in switch 100 by instructing switch 100 to generate the marking component 120 and one or more tracing components 130. For example, the controller 110 may instruct switch 100 to generate a marking component flow table (to serve as the marking component 120) and one or more tracing component flow entries (to serve as tracing components 130). As shown in the diagram, the packet tracing infrastructure includes a tracing component 130 for each flow table 115. It should be understood, however, that in other embodiments, only a subset of flow tables 115 may include a tracing component 130.

Once the packet tracing infrastructure is setup, the controller 110 may enable packet tracing for a particular flow by instructing the marking component 120 to mark packets belonging to that flow. For example, the controller 110 may accomplish this by instructing the switch 100 to generate a new flow entry in the marking component flow table that matches packets belonging to the flow and that includes a corresponding set of instructions that instruct the switch 100 to set the value in the first field associated with that packet and the value in the second field associated with that packet to indicate that tracing is enabled for that packet. This way, when a packet belonging to the flow arrives at switch 100, the packet will be marked for packet tracing. If the packet subsequently arrives at any of the flow tables 115 within the packet processing pipeline 200 of switch 100, the tracing component 130 of that flow table will transmit a trace message for the packet to the trace collector (e.g., controller 110).

Figure 4:
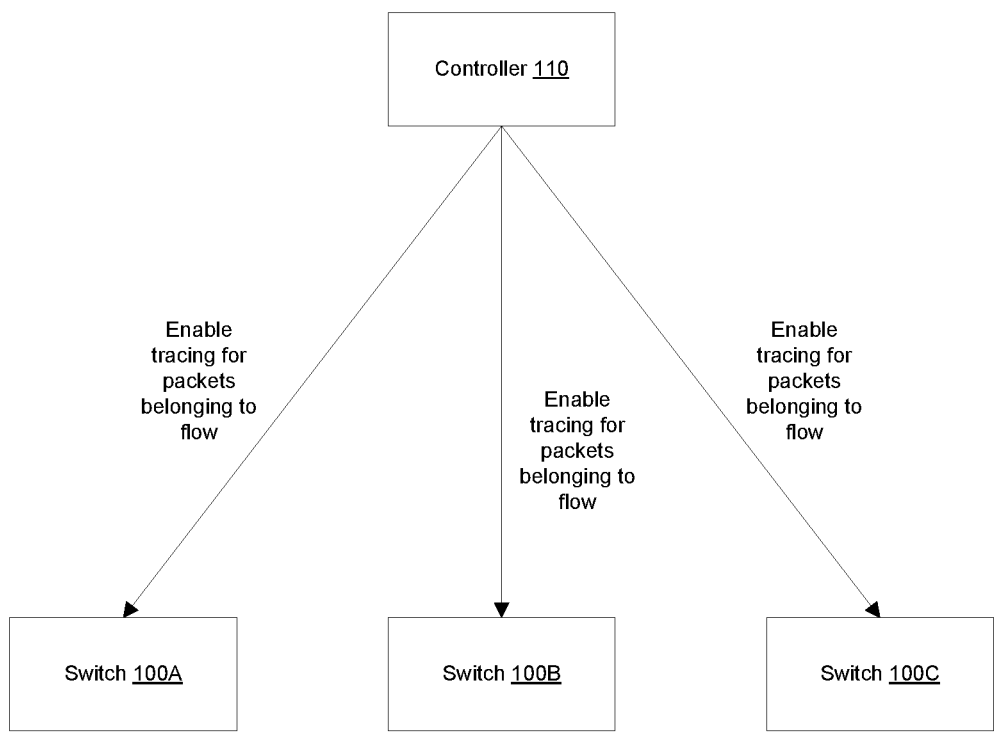
FIG. 4 is a block diagram illustrating a controller enabling packet tracing for packets belonging to a flow across multiple switches, according to some embodiments.

FIG. 4 is a block diagram illustrating a controller enabling packet tracing for packets belonging to a flow across multiple switches, according to some embodiments. As shown in the diagram, the controller 110 may employ the techniques described herein to enable packet tracing for a flow at multiple switches 100A-C. In this case, the trace collector (e.g., controller 110) may receive trace messages for a given packet from multiple switches 100 (e.g., from each switch 100 that the packet traverses). Also, for each switch 100, the trace collector may also receive multiple trace message for the packet from that switch 100 (e.g., for each flow table 115 that the packet traverses within the packet processing pipeline 200 of the switch 100). In one embodiment, the trace messages include a portion of the packet's header or other information that can be used to identify the packet. In one embodiment, the trace messages for the packet may include a portion of the packet's payload (e.g., first n bytes of the payload) in order to help distinguish trace messages for that packet from trace messages for other packets with the same header information. The trace collector or other entity responsible for analyzing collected trace packets may use such information included in collected trace packets to correlate trace messages that were generated for the same packet as the packet traveled through the network. These trace messages thus provide a comprehensive view of the path that a packet traversed at both the switch 100 level and at the flow table 115 level.

Figure 5:
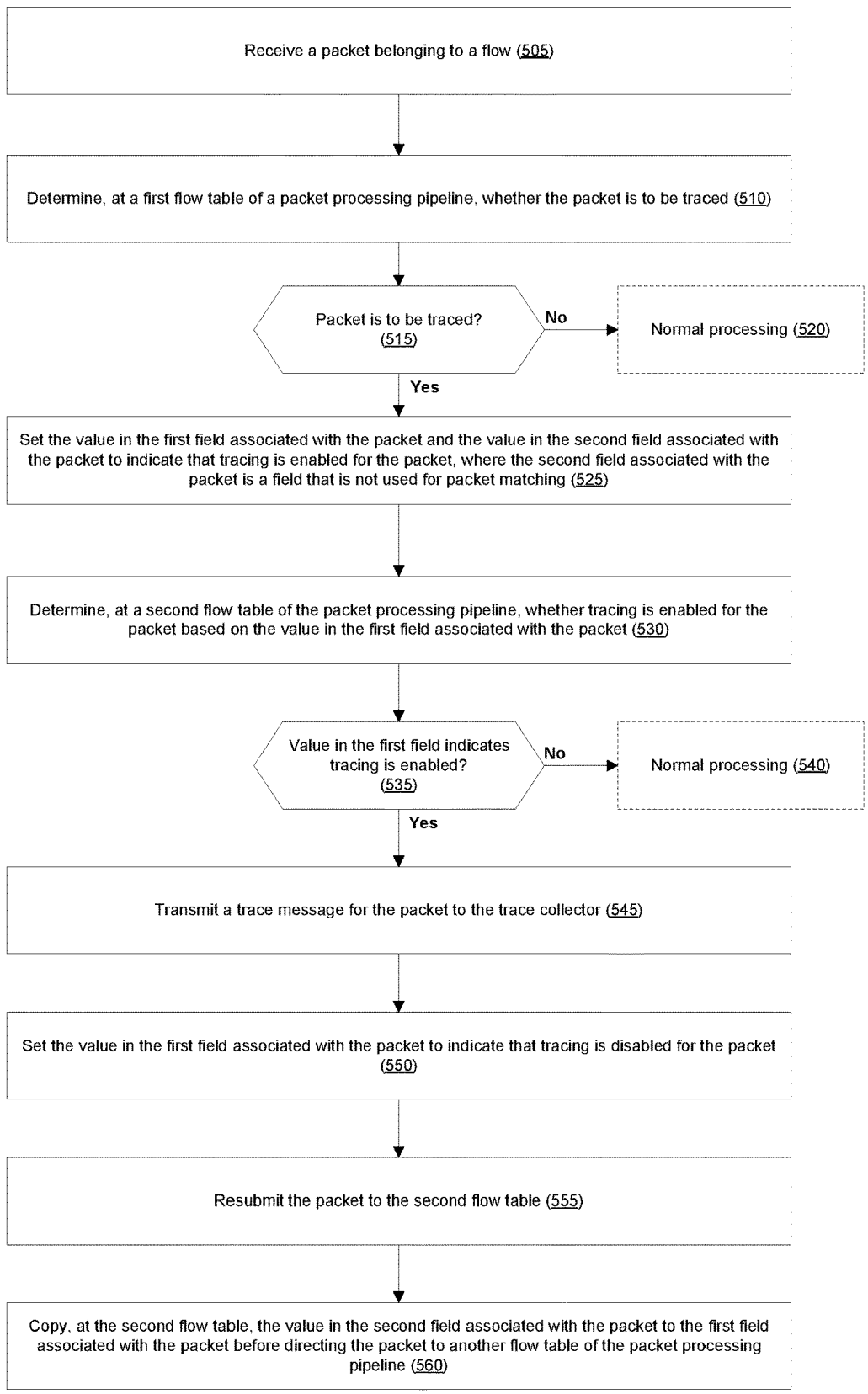
FIG. 5 is a flow diagram of a process for conditionally tracing packets in an SDN network, according to some embodiments.

FIG. 5 is a flow diagram of a process for conditionally tracing packets in an SDN network, according to some embodiments. In one embodiment, the process is implemented by a switch 100 in the SDN network. The switch 100 may include a packet processing pipeline 200 that includes a plurality of flow tables 115. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the switch 100 receives a packet belonging to a flow (block 505). The switch 100 determines, at a first flow table 115 of the packet processing pipeline (e.g., when the packet is being processed at the first flow table 115), whether the packet is to be traced (block 510). In one embodiment, the first flow table 115 is a marking component flow table. At decision block 515, if the packet is not to be traced, then the switch 100 continues with normal processing (e.g., processing the packet without tracing) (block 520). However, if the packet is to be traced, the switch 100 sets the value in the first field associated with the packet and the value in the second field associated with the packet to indicate that tracing is enabled for the packet, where the second field associated with the packet is a field that is not used for packet matching (block 525). This operation serves to mark the packet for tracing. In an embodiment where the switch 100 implements OpenFlow (and thus the packet processing pipeline 200 is an OpenFlow packet processing pipeline 200), the first field is a predetermined bit in a metadata field associated with the packet and the second field is a predetermined bit in a packet register field associated with the packet. In one embodiment, if the packet is to be traced, the switch 100 transmits a trace message for the packet to a trace collector. In one embodiment, the first flow table includes a flow entry that includes a packet matching criteria that matches packets belonging to the flow and a corresponding set of instructions that instruct the switch 100 to set the value in the first field associated with a packet matching the packet matching criteria and the value in a second field associated with the packet matching the packet matching criteria to indicate that tracing is enabled for the packet matching the packet matching criteria.

As the packet is processed by the packet processing pipeline 200 of the switch 100, the packet may arrive at a second flow table 115 of the packet processing pipeline 200. The switch 100 then determines, at the second flow table 115 of the packet processing pipeline 200 (e.g., when the packet is being processed at the second flow table 115), whether tracing is enabled for the packet based on the value in the first field associated with the packet (block 530). At decision block 535, if the value in the first field associated with the packet indicates that tracing is disabled for the packet, then the switch 100 proceeds with normal processing (e.g., processing the packet without tracing) (block 540). However, if the value in the first field associated with the packet indicates that tracing is enabled for the packet, the switch 100 transmits a trace message for the packet to the trace collector (block 545). In one embodiment, the trace collector is the controller 110 that manages the switch 100. The switch 100 also sets the value in the first field associated with the packet to indicate that tracing is disabled for the packet (block 550) and resubmits the packet to the second flow table 115 (block 555). In one embodiment, the second flow table includes a first flow entry that includes a packet matching criteria that matches packets for which the value in the first field indicates that tracing is enabled and a corresponding set of instructions that instruct the switch 100 to transmit a trace message for a packet matching the packet matching criteria to the trace collector, set the value in the first field associated with the packet matching the packet matching criteria to indicate that tracing is disabled for the packet matching the packet matching criteria, and resubmit the packet matching the packet matching criteria to the second flow table.

When the packet is resubmitted to the second flow table 115, the packet is matched against normal (non-tracing) flow entries 125 of the second flow table 115. The packet may match a flow entry that includes instructions that instruct the switch 100 to direct the packet to another flow table 115 of the packet processing pipeline 200. In one embodiment, before the switch 100 directs the packet to another flow table 115 of the packet processing pipeline 200, the switch 100 copies, at the second flow table 115, the value in the second field associated with the packet to the first field associated with the packet (e.g., in addition to performing other non-tracing related packet processing operations) (block 560). In other words, the switch 100 copies contents from the second field associated with the packet to the first field associated with the packet. This allows the packet to be traced at the next flow table. In one embodiment, the second flow table includes a second flow entry that includes a packet matching criteria and a corresponding set of instructions that instruct the switch 100 to copy the value in the second field associated with a packet matching the packet matching criteria to the first field associated with the packet matching the packet matching criteria. In one embodiment, the first flow entry mentioned above has higher priority than the second flow entry (e.g., packets are matched against first flow entry before being matched against second flow entry).

FIG. 6 is a flow diagram of a process for causing a switch to conditionally trace packets in an SDN network, according to some embodiments. In one embodiment, the process is implemented by a controller 110 in the SDN network. The controller 110 may be communicatively coupled to a switch 100 in the SDN network, where the switch 100 includes a packet processing pipeline 200 that includes a plurality of flow tables 115.

The controller 110 transmits a first set of instructions to the switch 100 that instruct the switch 100 to, for each packet belonging to a flow that arrives at a first flow table 115 of the packet processing pipeline 200 (e.g., each packet that matches a particular flow entry), set the value in the first field associated with that packet and the value in the second field associated with that packet to indicate that tracing is enabled for that packet, where the second field associated with the packet is a field that is not used for packet matching (block 610). In one embodiment, the first flow table 115 is a marking component flow table. In an embodiment where the switch 100 implements OpenFlow (and thus the packet processing pipeline 200 is an OpenFlow packet processing pipeline 200), the first field is a predetermined bit in a metadata field associated with the packet and the second field is a predetermined bit in a packet register field associated with the packet. The first set of instructions causes the switch 100 to mark packets belonging to the flow for tracing. In one embodiment, the first set of instructions include an instruction that instructs the switch 100 to generate a flow entry in the first flow table 115 that includes instructions that instruct the switch 100 to perform the aforementioned operations (e.g., a FLOW_MOD message in OpenFlow). In one embodiment, the controller 110 further transmits a second set of instructions to the switch 100 that instruct the switch 100 to, for each packet that arrives at a second flow table of the packet processing pipeline 200 for which the value in the first field associated with that packet indicates that tracing is enabled for that packet, transmit a trace message for that packet to a trace collector, set the value in the first field associated with that packet to indicate that tracing is disabled for that packet, and resubmit that packet to the second flow table (block 620). In one embodiment, the trace collector is the controller 110. In one embodiment, the second set of instructions includes an instruction that instructs the switch 100 to generate a flow entry in the second flow table 115 that includes instructions that instruct the switch 100 to perform the aforementioned operations. In one embodiment, the controller 110 further transmits a third set of instructions to the switch 100 that instruct the switch 100 to, for each packet matching a flow entry in the second flow table 115, copy the value in the second field associated with that packet to the first field associated with that packet (e.g., in addition to performing other non-tracing related packet processing operations) (block 630). In one embodiment, the third set of instructions includes an instruction that instructs the switch 100 to generate the flow entry in the second flow table 115, where the flow entry includes instructions that instruct the switch 100 to perform the aforementioned operations (e.g., copying the value in the second field associated with that packet to the first field associated with that packet and other non-tracing related packet processing operations).

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

Software 720 can include code such as conditional tracing component 725, which when executed by networking hardware 710, causes the special-purpose network device 702 to perform operations of one or more embodiments of the present invention as part networking software instances 722.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the NIC(s) 744, as well as optionally between the instances 762A-R; in addition, this virtual switch may enforce network isolation between the VNEs 760A-R that by policy are not permitted to communicate with each other (e.g., by honoring virtual local area networks (VLANs)).

Software 750 can include code such as conditional tracing component 763, which when executed by processor(s) 742, cause the general purpose network device 704 to perform operations of one or more embodiments of the present invention as part software instances 762A-R.

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
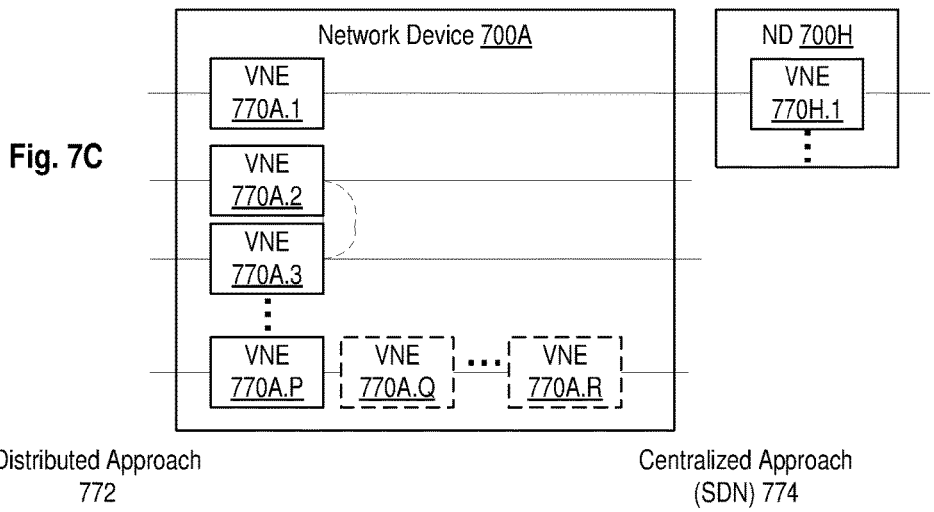
FIG. 7C illustrates various exemplary ways in which virtual network elements (VNEs) may be coupled, according to some embodiments.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
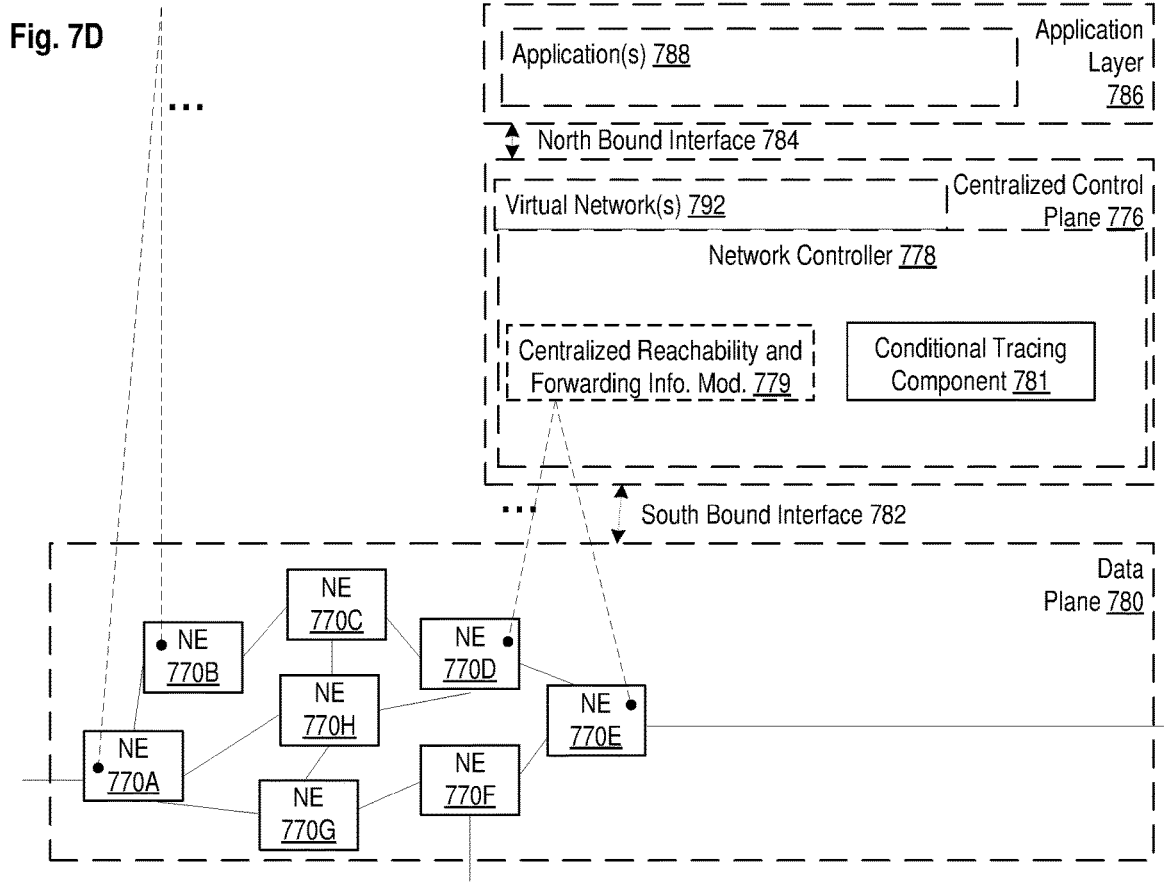
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. In one embodiment, the network controller 778 may include a conditional tracing component 781 that when executed by the network controller 778, causes the network controller 778 to perform operations of one or more embodiments described herein above.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
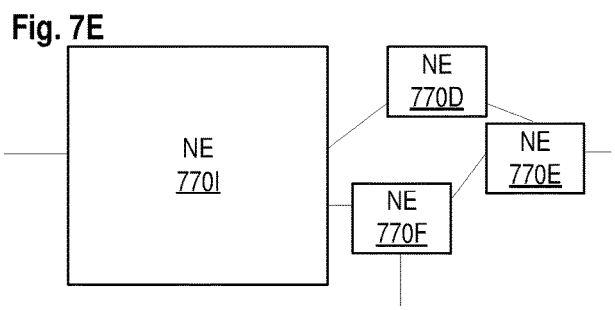
FIG. 7E illustrates the simple case of where each of the NDs implements a single NE, but a centralized control plane has abstracted multiple of the NEs in different NDs into (to represent) a single NE in one of the virtual network(s), according to some embodiments.
Figure 7F:
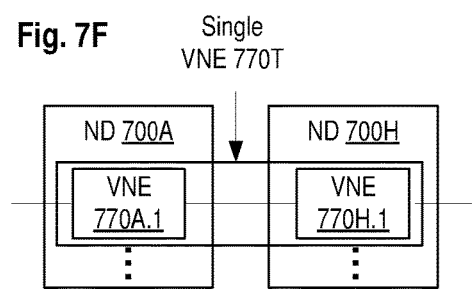
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
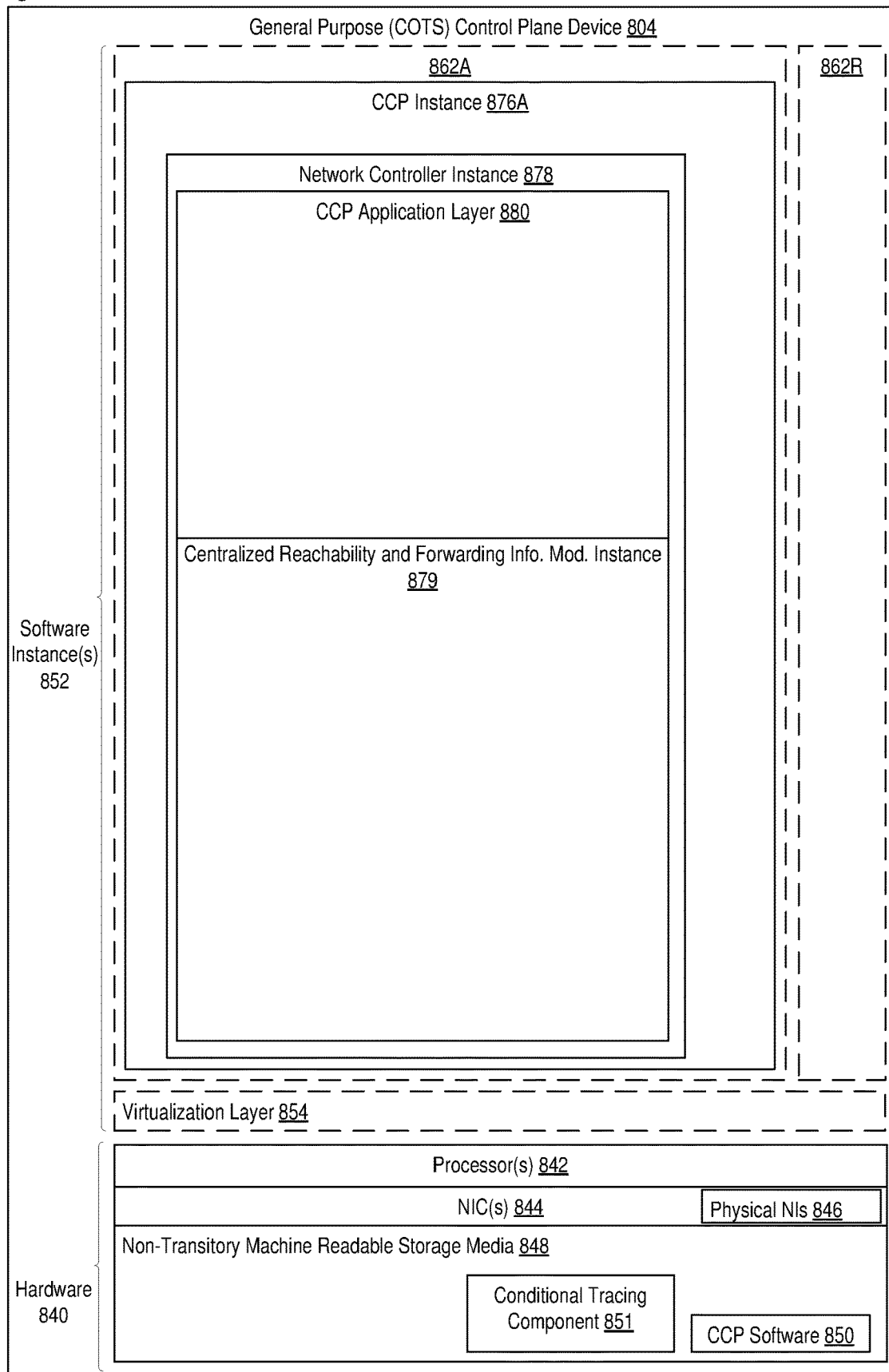
FIG. 8 illustrates a general purpose control plane device with centralized control plane (CCP) software, according to some embodiments.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850 and a conditional tracing component 851.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view.

The conditional tracing component 851 can be executed by hardware 840 to perform operations of one or more embodiments of the present invention as part of software instances 852.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a switch in a Software Defined Networking (SDN) network to trace packets belonging to a flow in the SDN network, where the switch includes a packet processing pipeline that includes a plurality of flow tables, the method comprising:
   receiving a packet belonging to the flow;
   setting a value in a first field associated with the packet and a value in a second field associated with the packet to indicate that tracing is enabled for the packet in response to a determination at a first flow table of the packet processing pipeline that the packet is to be traced, wherein the second field associated with the packet is a field that is not used for packet matching;
   determining, at a second flow table of the packet processing pipeline, whether tracing is enabled for the packet based on the value in the first field associated with the packet;
   transmitting a trace message for the packet to a trace collector in response to a determination at the second flow table that tracing is enabled for the packet;
   setting a value in the first field associated with the packet to indicate that tracing is disabled for the packet,
      wherein the second flow table includes a first flow entry that includes a packet matching criteria that matches packets for which a value in a first field indicates that tracing is enabled and a corresponding set of instructions that instruct the switch to transmit a trace message for a packet matching the packet matching criteria to the trace collector, set a value in a first field associated with the packet matching the packet matching criteria to indicate that tracing is disabled for the packet matching the packet matching criteria, and resubmit the packet matching the packet matching criteria to the second flow table;
   resubmitting the packet to the second flow table; and
   copying, at the second flow table, the value in the second field associated with the packet to the first field associated with the packet before directing the packet to another flow table of the packet processing pipeline.

2. The method of claim 1, wherein the packet processing pipeline is an OpenFlow packet processing pipeline, and wherein the first field is a bit in a metadata field associated with the packet.

3. The method of claim 1, wherein the packet processing pipeline is an OpenFlow packet processing pipeline, and wherein the second field is a bit in a packet register field associated with the packet.

4. The method of claim 1, wherein the trace collector is a controller in the SDN network.

5. The method of claim 1, further comprising:
   transmitting a second trace message for the packet to the trace collector in response to the determination at the first flow table that the packet is to be traced.

6. The method of claim 1, wherein the first flow table includes a flow entry that includes a packet matching criteria that matches packets belonging to the flow and a corresponding set of instructions that instruct the switch to set a value in a first field associated with a packet matching the packet matching criteria and a value in a second field associated with the packet matching the packet matching criteria to indicate that tracing is enabled for the packet matching the packet matching criteria.

7. The method of claim 1, wherein the second flow table includes a second flow entry that includes a packet matching criteria and a corresponding set of instructions that instruct the switch to copy a value in a second field associated with a packet matching the packet matching criteria to a first field associated with the packet matching the packet matching criteria, wherein the first flow entry has higher priority than the second flow entry.

8. A method implemented by a controller in a Software Defined Networking (SDN) network to cause a switch in the SDN network to trace packets belonging to a flow, where the controller is communicatively coupled to the switch, and where the switch includes a packet processing pipeline that includes a plurality of flow tables, the method comprising:
   transmitting a first set of instructions to the switch that instruct the switch to, for each packet belonging to the flow that arrives at a first flow table of the packet processing pipeline, set a value in a first field associated with that packet and a value in a second field associated with that packet to indicate that tracing is enabled for that packet, wherein the second field associated with that packet is a field that is not used for packet matching; and
   transmitting a second set of instructions to the switch that instruct the switch to, for each packet that arrives at a second flow table of the packet processing pipeline that has a value in a first field that indicates that tracing is enabled, transmit a trace message for that packet to a trace collector, set a value in a first field associated with that packet to indicate that tracing is disabled for that packet, and resubmit that packet to the second flow table;
   wherein the second flow table includes a first flow entry that includes a packet matching criteria that matches packets for which the value in the first field indicates that tracing is enabled and a corresponding set of instructions that instruct the switch to transmit the trace message for that packet to the trace collector, set the value in the first field associated with that packet to indicate that tracing is disabled for that packet, and resubmit that packet to the second flow table.

9. The method of claim 8, further comprising:
   transmitting a third set of instructions to the switch that instruct the switch to, for each packet matching a flow entry in the second flow table, copy a value in a second field associated with that packet to a first field associated with that packet.

10. The method of claim 8, wherein the packet processing pipeline of the switch is an OpenFlow packet processing pipeline, and wherein the first field is a bit in a metadata field.

11. The method of claim 8, wherein the packet processing pipeline of the switch is an OpenFlow packet processing pipeline, and wherein the second field is a bit in a packet register field.

12. A network device configured to function as a switch in a Software Defined Networking (SDN) network to trace packets belonging to a flow in the SDN network, where the switch includes a packet processing pipeline that includes a plurality of flow tables, the network device comprising:
a set of one or more processors; and
a non-transitory machine-readable storage medium having stored therein a conditional tracing component, which when executed by the set of one or more processors, causes the network device to receive a packet belonging to the flow, set a value in a first field associated with the packet and a value in a second field associated with the packet to indicate that tracing is enabled for the packet in response to a determination at a first flow table of the packet processing pipeline that the packet is to be traced, wherein the second field associated with the packet is a field that is not used for packet matching, determine, at a second flow table of the packet processing pipeline, whether tracing is enabled for the packet based on the value in the first field associated with the packet, transmit a trace message for the packet to a trace collector in response to a determination at the second flow table that tracing is enabled for the packet, set a value in the first field associated with the packet to indicate that tracing is disabled for the packet, resubmit the packet to the second flow table, and copy, at the second flow table, the value in the second field associated with the packet to the first field associated with the packet before directing the packet to another flow table of the packet processing pipeline,
wherein the second flow table includes a first flow entry that includes a packet matching criteria that matches packets for which a value in a first field indicates that tracing is enabled and a corresponding set of instructions that instruct the switch to transmit a trace message for a packet matching the packet matching criteria to the trace collector, set a value in a first field associated with the packet matching the packet matching criteria to indicate that tracing is disabled for the packet matching the packet matching criteria, and resubmit the packet matching the packet matching criteria to the second flow table.

13. The network device of claim 12, wherein the packet processing pipeline is an OpenFlow packet processing pipeline, and wherein the first field is a bit in a metadata field associated with the packet.

14. The network device of claim 12, wherein the packet processing pipeline is an OpenFlow packet processing pipeline, and wherein the second field is a bit in a packet register field associated with the packet.

15. A network device to function as a controller in a Software Defined Networking (SDN) network to cause a switch in the SDN network to trace packets belonging to a flow, where the controller is communicatively coupled to the switch, and where the switch includes a packet processing pipeline that includes a plurality of flow tables, the network device comprising:
a set of one or more processors; and
a non-transitory machine-readable storage medium having stored therein a conditional tracing component, which when executed by the set of one or more processors, causes the network device to transmit a first set of instructions to the switch that instruct the switch to, for each packet belonging to the flow that arrives at a first flow table of the packet processing pipeline, set a value in a first field associated with that packet and a value in a second field associated with that packet to indicate that tracing is enabled for that packet, wherein the second field associated with that packet is a field that is not used for packet matching,
wherein the second flow table includes a first flow entry that includes a packet matching criteria that matches packets for which a value in a first field indicates that tracing is enabled and a corresponding set of instructions that instruct the switch to transmit a trace message for a packet matching the packet matching criteria to the trace collector, set a value in a first field associated with the packet matching the packet matching criteria to indicate that tracing is disabled for the packet matching the packet matching criteria, and resubmit the packet matching the packet matching criteria to the second flow table;
wherein the second flow table includes a first flow entry that includes a packet matching criteria that matches packets for which the value in the first field indicates that tracing is enabled and a corresponding set of instructions that instruct the switch to transmit the trace message for that packet to the trace collector, set the value in the first field associated with that packet to indicate that tracing is disabled for that packet, and resubmit that packet to the second flow table.

16. The network device of claim 15, wherein the conditional tracing component, when executed by the set of one or more processors, further causes the network device to transmit a second set of instructions to the switch that instruct the switch to, for each packet that arrives at a second flow table of the packet processing pipeline that has a value in a first field that indicates that tracing is enabled, transmit a trace message for that packet to a trace collector, set a value in a first field associated with that packet to indicate that tracing is disabled for that packet, and resubmit that packet to the second flow table.

17. The network device of claim 16, wherein the conditional tracing component, when executed by the set of one or more processors, further causes the network device to transmit a third set of instructions that instruct the switch to the switch to, for each packet matching a flow entry in the second flow table, copy a value in a second field associated with that packet to a first field associated with that packet.

18. A non-transitory machine-readable medium having computer code stored therein, which when executed by a set of one or more processors of a network device functioning as a switch in a Software Defined Networking (SDN) network, causes the network device to perform operations for tracing packets belonging to a flow in the SDN network, where the switch includes a packet processing pipeline that includes a plurality of flow tables, the operations comprising:
receiving a packet belonging to the flow;
setting a value in a first field associated with the packet and a value in a second field associated with the packet to indicate that tracing is enabled for the packet in response to a determination at a first flow table of the packet processing pipeline that the packet is to be traced, wherein the second field associated with the packet is a field that is not used for packet matching;

determining, at a second flow table of the packet processing pipeline, whether tracing is enabled for the packet based on the value in the first field associated with the packet;

transmitting a trace message for the packet to a trace collector in response to a determination at the second flow table that tracing is enabled for the packet;

setting a value in the first field associated with the packet to indicate that tracing is disabled for the packet,
wherein the second flow table includes a first flow entry that includes a packet matching criteria that matches packets for which a value in a first field indicates that tracing is enabled and a corresponding set of instructions that instruct the switch to transmit a trace message for a packet matching the packet matching criteria to the trace collector, set a value in a first field associated with the packet matching the packet matching criteria to indicate that tracing is disabled for the packet matching the packet matching criteria, and resubmit the packet matching the packet matching criteria to the second flow table;

resubmitting the packet to the second flow table; and copying, at the second flow table, the value in the second field associated with the packet to the first field associated with the packet before directing the packet to another flow table of the packet processing pipeline.

19. The non-transitory machine-readable medium of claim 18, wherein the packet processing pipeline is an OpenFlow packet processing pipeline, and wherein the first field is a bit in a metadata field associated with the packet.

20. The non-transitory machine-readable medium of claim 18, wherein the packet processing pipeline is an OpenFlow packet processing pipeline, and wherein the second field is a bit in a packet register field associated with the packet.

21. The non-transitory machine-readable medium of claim 18, wherein the computer code, when executed by the set of one or more processors of the network device, causes the network device to perform further operations comprising:

transmitting a second trace message for the packet to the trace collector in response to the determination at the first flow table that the packet is to be traced.

22. A non-transitory machine-readable medium having computer code stored therein, which when executed by a set of one or more processors of a network device functioning as a controller in a Software Defined Networking (SDN) network, causes the network device to perform operations for causing a switch in the SDN network to trace packets belonging to a flow, where the controller is communicatively coupled to the switch, and where the switch includes a packet processing pipeline that includes a plurality of flow tables, the operations comprising:

transmitting a first set of instructions to the switch that instruct the switch to, for each packet belonging to the flow that arrives at a first flow table of the packet processing pipeline, set a value in a first field associated with that packet and a value in a second field associated with that packet to indicate that tracing is enabled for that packet, wherein the second field associated with that packet is a field that is not used for packet matching; and transmitting a second set of instructions to the switch that instruct the switch to, for each packet that arrives at a second flow table of the packet processing pipeline that has a value in a first field that indicates that tracing is enabled, transmit a trace message for that packet to a trace collector, set a value in a first field associated with that packet to indicate that tracing is disabled for that packet, and resubmit that packet to the second flow table;

wherein the second flow table includes a first flow entry that includes a packet matching criteria that matches packets for which the value in the first field indicates that tracing is enabled and a corresponding set of instructions that instruct the switch to transmit the trace message for that packet to the trace collector, set the value in the first field associated with that packet to indicate that tracing is disabled for that packet, and resubmit that packet to the second flow table.

23. The non-transitory machine-readable medium of claim 22, wherein the computer code, when executed by the set of one or more processors of the network device, causes the network device to perform further operations comprising:

transmitting a second set of instructions to the switch that instruct the switch to, for each packet that arrives at a second flow table of the packet processing pipeline that has a value in a first field that indicates that tracing is enabled, transmit a trace message for that packet to a trace collector, set a value in a first field associated with that packet to indicate that tracing is disabled for that packet, and resubmit that packet to the second flow table.

24. The non-transitory machine-readable medium of claim 23, wherein the computer code, when executed by the set of one or more processors of the network device, causes the network device to perform further operations comprising:

transmitting a third set of instructions to the switch that instruct the switch to, for each packet matching a flow entry in the second flow table, copy a value in a second field associated with that packet to a first field associated with that packet.

* * * * *